United States Patent
Qi et al.

(10) Patent No.: US 10,276,309 B2
(45) Date of Patent: Apr. 30, 2019

(54) PLASMON-ENHANCED DYE-SENSITIZED SOLAR CELLS

(71) Applicant: MASSACHUSETTS INSTITUTE OF TECHNOLOGY, Cambridge, MA (US)

(72) Inventors: Jifa Qi, West Roxbury, MA (US); Xiangnan Dang, Cambridge, MA (US); Angela M. Belcher, Lexington, MA (US); Paula T. Hammond, Newton, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 14/434,098

(22) PCT Filed: Oct. 8, 2013

(86) PCT No.: PCT/US2013/063851
§ 371 (c)(1),
(2) Date: Apr. 7, 2015

(87) PCT Pub. No.: WO2014/058861
PCT Pub. Date: Apr. 17, 2014

(65) Prior Publication Data
US 2015/0262760 A1    Sep. 17, 2015

Related U.S. Application Data

(60) Provisional application No. 61/710,878, filed on Oct. 8, 2012.

(51) Int. Cl.
*H01G 9/00* (2006.01)
*H01G 9/20* (2006.01)
*B82Y 20/00* (2011.01)
*B82Y 40/00* (2011.01)

(52) U.S. Cl.
CPC ........ *H01G 9/2031* (2013.01); *H01G 9/0029* (2013.01); *H01G 9/209* (2013.01); *H01G 9/2027* (2013.01); *H01G 9/2036* (2013.01); *B82Y 20/00* (2013.01); *B82Y 40/00* (2013.01); *Y02E 10/542* (2013.01); *Y02P 70/521* (2015.11); *Y10S 977/89* (2013.01); *Y10S 977/948* (2013.01)

(58) Field of Classification Search
CPC .. H01G 9/2036; H01G 9/2027; H01G 9/2031; H01G 9/0029; Y02E 10/542; B82Y 20/00; B82Y 40/00
USPC ............ 136/252, 263; 977/948, 700; 438/63
See application file for complete search history.

(56) References Cited

U.S. PATENT DOCUMENTS

2002/0187347 A1* 12/2002 Halas ................. A61K 41/0042
                                                                    428/403

OTHER PUBLICATIONS

Atwater, H. A., et al., "Plasmonics for Improved Photovoltaic Devices," *Nature Materials, Nature Publishing Group* London, GB 9:3 (2010): 205-213.

(Continued)

*Primary Examiner* — Lindsey A Bernier
(74) *Attorney, Agent, or Firm* — Steptoe & Johnson LLP

(57) ABSTRACT

A dye-sensitized solar cell can include a plurality of a plasmon-forming nanostructures. The plasmon-forming nanostructures can include an oxide core, an inner metallic shell on a surface of the oxide core, and an outer oxide shell on a surface of the inner metallic shell.

14 Claims, 5 Drawing Sheets

(56) References Cited

OTHER PUBLICATIONS

Dang, Xiangnan, et al., "Tunable Localized Surface Plasmon-Enabled Broadband Light-Harvesting Enhancement for High-Efficiency Panchromatic Dye-Sensitized Solar Cells," *Nano Letters* 13:2 (2013): 637-642.

Qi, Jifa, et al., "Highly Efficient Plasmon-Enhanced Dye-Sensitized Solar Cells through Metal@Oxide Core-Shell Nanostructure," *ACS Nano* 5:9 (2011): 7108-7116.

Williams, Vanessa O., et al. "Fast Transporting ZnO-TiO 2 Coaxial Photoanodes for Dye-Sensitized Solar Cells Based on ALD-Modified SiO 2 Aerogel Frameworks," *ACS Nano* 6:7 (20012): 6185-6196.

International Search Report and Written Opinion from PCT/US2013/63851 dated Dec. 13, 2013.

\* cited by examiner

PLASMON-ENHANCED DYE-SENSITIZED SOLAR CELLS

CLAIM OF PRIORITY

This application claims the benefit of prior under 35 USC 371 to International Application No. PCT/US2013/063851, filed Oct. 8, 2013, which claims priority to U.S. Provisional Application No. 61/710,878, filed Oct. 8, 2012, each of which is incorporated by reference in its entirety.

TECHNICAL FIELD

The present invention generally relates to plasmon enhanced dye-sensitized solar cells.

BACKGROUND

The need for preserving non-renewable energy and lowering carbon dioxide emission requires efficient and inexpensive approaches to utilize solar energy. Dye-sensitized solar cells (DSSCs) are a promising technology due to their low cost and potentially higher efficiency than silicon solar cells. DSSCs offer high internal quantum efficiency, large surface-to-volume ratio, and a tunable absorption range.

SUMMARY

Panchromatic DSSCs can be realized by adding plasmonic nanostructures to the photoanode. The plasmonic nanostructures can have a composite core-multiple shell structure, e.g., an oxide core, an inner metallic shell and an outer oxide shell.

In one aspect, a dye-sensitized solar cell includes a photoanode including a plurality of $TiO_2$ nanoparticles and a plurality of a plasmon-forming nanostructures, wherein each plasmon-forming nanostructure includes an oxide core, an inner metallic shell on a surface of the oxide core, and an outer oxide shell on a surface of the inner metallic shell.

The oxide core can include $TiO_2$. The inner metallic shell can include Au, Ag, or a combination thereof. The outer oxide shell can include $TiO_2$. The oxide core can have a diameter of no greater than 50 nm. The inner metallic shell can have a thickness of no greater than 5 nm. The outer oxide shell can have a thickness of no greater than 5 nm.

The plurality of plasmon-forming nanostructures can be interspersed with the plurality of $TiO_2$ nanoparticles. The plasmon-forming nanostructures can be 0.01 wt % to 2.5 wt % of the total nanoparticles in the photoanode.

In another aspect, a method of generating solar power includes illuminating a dye-sensitized solar cell including a plurality of $TiO_2$ nanoparticles and a plurality of a plasmon-forming nanostructures, wherein each plasmon-forming nanostructure includes an oxide core, an inner metallic shell on a surface of the oxide core, and an outer oxide shell on a surface of the inner metallic shell.

The oxide core can include $TiO_2$. The inner metallic shell can include Au, Ag, or a combination thereof. The outer oxide shell can include $TiO_2$. The oxide core can have a diameter of no greater than 50 nm. The inner metallic shell can have a thickness of no greater than 5 nm. The outer oxide shell can have a thickness of no greater than 5 nm.

The plurality of plasmon-forming nanostructures can be interspersed with the plurality of $TiO_2$ nanoparticles. The plasmon-forming nanostructures can be 0.01 wt % to 2.5 wt % of the total nanoparticles in the photoanode.

In another aspect, a method of making a dye-sensitized solar cell includes forming a photoanode including a plurality of $TiO_2$ nanoparticles and a plurality of a plasmon-forming nanostructures, wherein each plasmon-forming nanostructure includes an oxide core, an inner metallic shell on a surface of the oxide core, and an outer oxide shell on a surface of the inner metallic shell.

Forming the photoanode can include depositing the plurality of plasmon-forming nanostructures on a substrate. Forming the photoanode can include mixing the plurality of $TiO_2$ nanoparticles with the plurality of plasmon-forming nanostructures prior to depositing. The oxide core can include $TiO_2$. The inner metallic shell can include Au, Ag, or a combination thereof. The outer oxide shell can include $TiO_2$. The oxide core can have a diameter of no greater than 50 nm. The inner metallic shell can have a thickness of no greater than 5 nm. The outer oxide shell can have a thickness of no greater than 5 nm.

The plurality of plasmon-forming nanostructures can be interspersed with the plurality of $TiO_2$ nanoparticles. The plasmon-forming nanostructures can be 0.01 wt % to 2.5 wt % of the total nanoparticles in the photoanode.

Other aspects, embodiments, and features will become apparent from the following description, the drawings, and the claims.

BRIEF DESCRIPTION OF THE DRAWINGS

FIGS. 3C-3D illustrate photo-generated electron collection in conventional DSSCs (FIG. 3C) and plasmon-enhanced DSSCs (FIG. 3D). FIGS. 3E-3F illustrate mechanisms of plasmon-enhanced DSSCs.

FIG. 4a, illustrations ($d_{core}$, $d_{Au}$, and $d_T$ represent core diameter, gold shell thickness and $TiO_2$ shell thickness, respectively) and transmission electron microscope (TEM) images of AgT, AuT, and TAuT nanoparticles. The scale bars are 5 nm. FIG. 4b is a photograph and absorption spectra of N719, AgT, AuT, TAuT-590 ($\lambda_{LSPR}$=590 nm), TAuT-700, and TAuT-810. FIG. 4c shows simulated EM intensity enhancement ($|E|^2/|E_0|^2$) in near field at $\lambda_{LSPR}$ for AgT ($d_{core}$=15 nm for all simulations unless specified, $d_T$=2 nm), AuT ($d_T$=2 nm), and TAuT ($d_{Au}$=3 nm, $d_T$=2 nm) nanoparticles.

DETAILED DESCRIPTION

Dye-sensitized solar cells (DSSCs) have attracted great attention for high power conversion efficiency (PCE; in some cases exceeding 12% (refs. 35-37)) and the low cost of materials and solution-based fabrication processes (refs. 1-5).

Figure 1:
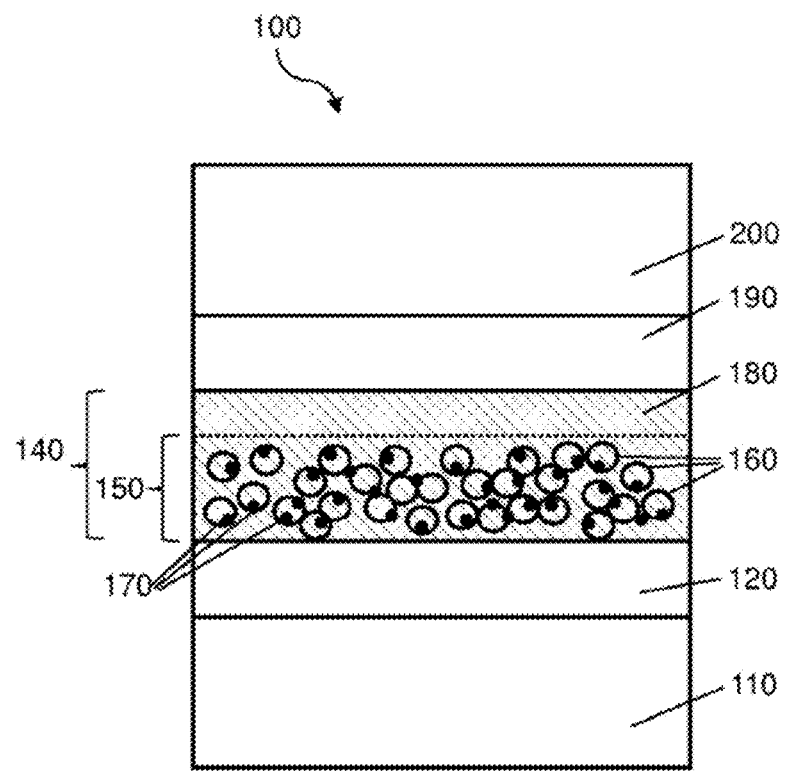
FIG. 1 is a schematic depiction of a dye-sensitized solar cell.

With reference to FIG. 1, solar cell 100 includes substrate 110 (e.g., glass) which supports current collector 120. Current collector 120 is proximate to photoanode 140 such that current can flow between photoanode 140 and current collector 120. Photoanode 140 can be a porous layer. Photoanode 140 can include porous layer 150 of a photoanode material. The photoanode material includes nanoparticles 160 of the photoanode material. The nanoparticles can be dispersed within a matrix. Nanoparticles 160 can be discrete nanoparticles, or can be interconnected by the matrix (which may also include or be made of the photoanode material), or the nanoparticles can include a mixture of discrete and interconnected nanoparticles. a combination of the two. Porosity in layer 150 can exist between and among nanoparticles 160. Light absorbing dye 170 is optionally adsorbed and/or covalently bound on the photoanode material. FIG. 1 illustrates dye 170 adsorbed to nanoparticles 160.

Photoanode 140 also includes electrolyte 180. Electrolyte 180 is in contact with, and can be suffused through, the porosity of porous layer 150. Electrolyte 180 is also in contact with conductive layer 190 (i.e., the cathode). Conductive layer 190 can be, for example, a layer of Pt. Conductive layer 190 is covered by cover layer 200, which is transparent, e.g., glass.

Composite materials, such as nanocomposite materials, can provide advantageous properties that non-composite materials cannot. For example, nanocomposites including plasmon-forming nanostructures can be useful in a variety of applications, including optoelectronic devices, such as light emitting devices, and photovoltaics, e.g., dye-sensitized solar cells. Metal nanoparticles, with an optional semiconducting oxide on the surface of the metal nanoparticle, can be plasmon-forming nanostructures.

To improve the power conversion efficiency (PCE) of DSSCs, conventional approaches include enhancing absorption of incident light (refs. 2,5) and improving collection of photo-generated carriers (refs. 6,7). PCE can be enhanced by increasing light harvesting (LH) or by enhancing carrier collection. Light harvesting (LH), the process of capturing solar energy with electrons, is an important factor of PCE and is directly determined by the bandgap energy ($E_g$) and extinction coefficient ($\varepsilon$) of the materials. LH efficiency (LHE) limits the achievable short-circuit current density ($J_{SC}$) and PCE of photovoltaic devices. Thicker photoanodes absorb more light (enhanced LH) but collect less photo-generated carriers due to charge recombination. Thus there is a tradeoff between light harvesting and carrier collection.

Effort has also been devoted to developing new dyes (refs. 8-10) and using semiconductor quantum dots (refs. 11-12) to improve PCE. Nevertheless, employing new dyes or quantum dots could change the adsorption of the sensitizers on the photoanode material (typically $TiO_2$), as well as their energy band positions relative to the conduction band of $TiO_2$ and the redox potential of electrolyte, affecting charge separation. Therefore, improving light harvest or carrier collection without affecting other factors has been considered a more effective approach to improve device performance (ref. 13).

Unbalanced LH at different wavelengths can also limit the achievable PCE; in other words, LH materials with low $\varepsilon$ or non-ideal $E_g$ inefficiently exploit the solar spectrum (usually red-near-infrared (NIR) region); $\varepsilon$ is inevitably small when the photon energy is close to $E_g$ or far away from the HOMO-LUMO gap. Most LH materials possess unbalanced LH in high and low absorption wavelength regions ($\lambda_{Hi}$ and $\lambda_{Lo}$), resulting in another tradeoff regarding the thickness of photoactive layers. Fully absorbing solar energy at $\lambda_{Lo}$ would again require larger absorption lengths (i.e., increased thickness) which reduces carrier collection, and only a small portion of the photoactive layers contribute to LH at $\lambda_{Hi}$. Consequently, the ability to balance LH at different wavelengths is desirable to construct a solar cell with similar absorption lengths over a broad spectral range. The optical density (OD), LHE, and IPCE are all correlated. LHE relates to OD as $LHE(\lambda)=1-Transmittance=1-10^{-OD(\lambda)}$. The LHE enhancement achieved is, $$LHE(\lambda)/LHE_0(\lambda)=(LHE_{LSP}(\lambda)-LHE_0(\lambda))/LHE_0(\lambda)= (1-10^{-OD(\lambda),LSP})/(1-10^{-OD(\lambda),0})-1.$$

Achieving such balanced LH would lead to panchromatic solar energy conversion, leading to increased overall LH and therefore increased overall PCE. Several approaches toward panchromatic DSSCs have been attempted to further improve the PCE, including the development of panchromatic dyes, co-adsorbing dyes, and energy relay systems (refs. 38-40). However, these methods require extensive synthesis and optimization for various parameters (e.g., spectral overlapping and spatial distance) and are limited to a small range of materials. Therefore, a general and simple approach for balanced LH and panchromatic DSSCs is required.

Localized surface plasmon (LSP) has potential for improving performance of DSSCs for the unique capability to improve the light absorption of dye with minimal impact on other material properties. Generally, there are three types of plasmonic light-trapping geometries (ref. 14), including far-field scattering, near-field LSP, and surface plasmon polaritons at the metal/semiconductor interface (see, e.g., Atwater, H. A.; Polman, A., *Nature Mater.* 2010, 9, 205-213, which is incorporated by reference in its entirety). Surface plasmon arising from metal nanoparticles has been applied to increase the optical absorption and/or photocurrent in a wide range of solar cell configurations, e.g., silicon solar cells, organic solar cells (refs. 19-21), organic bulk heterojunction solar cells (ref. 22), CdSe/Si heterostructures (ref. 23) and DSSCs (refs. 24-32). However, work on plasmon-enhanced DSSCs has reported improved dye absorption or photocurrent, while improved device performance was not observed (refs. 24-28). In addition, earlier plasmonic geometries contained metal nanoparticles in direct contact with the dye and the electrolyte (refs. 24-26, 29, 30), resulting in recombination and back reaction of photo-generated carriers and corrosion of metal nanoparticles by electrolyte.

Recently, core-shell Au@SiO$_2$ nanoparticles have been used to enhance PCE by preventing carrier recombination and back reaction (ref. 32). However, by using an insulating shell, some of the photo-generated carriers from the most absorption-enhanced dye molecules located on the surfaces of SiO$_2$ are lost, due to the difficulty in the injection to SiO$_2$.

A general and simple strategy for broadband LH enhancement and panchromatic DSSCs is described. This strategy, utilizing plasmonic multiple-core-shell oxide-metal-oxide nanoparticles, does not require the development of photo absorbers and energy transfer systems. These nanoparticles have adjustable LSP resonance (LSPR) wavelengths ($\lambda_{LSPR}$) of 600-1,000 nm and enhance near-field electromagnetic (EM) intensity. Compared to other geometries of plasmonic nanoparticles with tunable $\lambda_{LSPR}$, the multiple-core-shell nanoparticles feature larger electric-field enhancement and maintain plasmonic properties during device fabrication. Demonstrated by simulations and experiments, matching $\lambda_{LSPR}$ with $\lambda_{Hi}$ or $\lambda_{Lo}$ has different impact on the spectral response of LH. Although matching $\lambda_{LSPR}$ with $\lambda_{Hi}$ readily improves LH and PCE for thin photo-absorbing layers, matching $\lambda_{LSPR}$ with $\lambda_{Lo}$ maximally increases LH and PCE for practical photovoltaic devices with thicker photo-absorbing layers, through enhancing photo-absorption at the otherwise low-absorption wavelengths. By matching $\lambda_{LSPR}$ of TiO$_2$—Au—TiO$_2$ (TAuT) nanoparticles to $\lambda_{Lo}$ of a common ruthenium-based dye (N719), a panchromatic DSSC with balanced LH at different wavelengths and a PCE of 10.8% is achieved (30% increase comparing to DSSCs without plasmonic nanoparticles).

Figure 2:
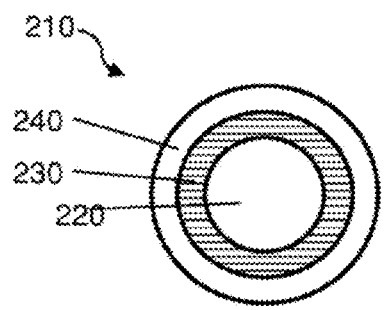
FIG. 2 is a schematic depiction of plasmon-forming nanoparticles.

With reference to FIGS. 1 and 2, photoanode 140 can further optionally include nanostructures 210. Nanostructures 210 can include an oxide core 220 and an inner metallic shell 230 on a surface of the oxide core. Oxide core 220 can be made from a semiconducting oxide material, for example, TiO$_2$, ZnO, HfO$_2$, SiO$_2$, MTiO$_3$ (where M=Ca, Ba, Sr, or La), an iron oxide; or a combination thereof. Inner metallic shell 230 includes a metal such as Au, Ag, Pt, Pd, or Cu; or a metal titanate such as lead zirconate titanate or calcium copper titanate. Nanostructure 210 can include an outer oxide shell 240 on a surface of the inner metallic shell 230. Outer oxide shell 240 can independently be made from the materials suitable for oxide core 200, i.e., TiO$_2$, ZnO, HfO$_2$, SiO$_2$, MTiO$_3$ (where M=Ca, Ba, Sr, or La), an iron oxide; or a combination thereof. In some cases, oxide core 220 and outer oxide shell 240 can be made from the same material; for example both oxide core 220 and outer oxide shell 240 can be made from TiO$_2$.

Nanoparticle 220 can have any of a variety of shapes, including spherical, oblate, elongated, rod-shaped, wire-shaped, cubic, tetrahedral, octahedral, or another regular or irregular shape. A combination of nanoparticles having different shapes can be used. Nanoparticles having various shapes, and methods for making these, are known in the art. Methods for formation of an oxide core are known, as are methods for formation of an inner metallic shell and an outer oxide shell. The size of nanoparticle 220 can be small, e.g., having a diameter of no larger than 200 nm, no larger than 150 nm, no larger than 100 nm, no larger than 50 nm, no larger than 40 nm, no larger than 30 nm, or less. Inner metallic shell 230 can have a thickness of, for example, less than 20 nm, less than 15 nm, from 1 to 10 nm, or from 2 to 5 nm. Outer oxide shell 240 can have a thickness of, for example, less than 20 nm, less than 15 nm, from 1 to 10 nm, or from 2 to 5 nm In some instances, oxide core 220 and/or outer oxide shell 240 can include or be made of the same material(s) as found in the photoanode material (the material(s) that are found in or make up nanoparticles 160, or the material(s) that are found in or make up the optional matrix in which nanoparticles 160 are dispersed). For example, photoanode 140 can include a TiO$_2$ matrix in which TiO$_2$ nanoparticles 160 can be dispersed. Optionally, plasmon-forming nanoparticles 210 where oxide core 220 and/or outer oxide shell 240 are TiO$_2$ can also be dispersed in the TiO$_2$ matrix of photoanode 140. In this regard, see also FIGS. 3A and 3B.

When the oxide is a semiconducting oxide, carriers can be more readily transferred to the photoanode material than if the oxide is an insulator. This transfer can be particularly facilitated when both the semiconducting oxide and the photoanode material include TiO$_2$.

Porous layer 150 can be made by first preparing a population of nanoparticles of a photoanode material, e.g., TiO$_2$, followed by a spin-casting procedure to deposit the nanoparticles over a current collector. For porous layers including nanoparticles 210, a population of plasmon-forming nanoparticles can be formed separately. The photoanode nanoparticles and the plasmon-forming nanoparticles can be combined in a desired ratio prior to depositing over the current collector. The desired ratio can be measured with regard to wt % of the plasmon-forming nanoparticles in the total combined population of nanoparticles prior to depositing. Once the combined population has been formed, porous layer 150 can be made with the combined population according to conventional procedures.

The structure and mechanism of the conventional and plasmon-enhanced DSSCs is illustrated in FIGS. 3A-3D. In the conventional DSSCs (FIGS. 3A and 3C), the dyes absorb incident light and generate electrons in excited states, which inject into the TiO$_2$ nanoparticles. The dye molecules are regenerated by electrons transferred from the electrolyte, which can be a solid or liquid electrolyte. For purposes of illustration only, and not by way of limitation, the following discussion is made with reference to a liquid electrolyte including I$^-$ and I$_3^-$. The regenerative cycle is completed by reducing triiodide to iodide at the Pt cathode. The electrons in TiO$_2$ diffuse to the current collector (fluorine-doped tin oxide, FTO). In the plasmon-enhanced DSSCs, the LSP arising from plasmonic nanoparticles increases dye absorption, allowing the thickness of photoanode to be decreased for a given level of light absorption. By decreasing the thickness of photoanode, less materials are required, and both recombination and back reaction of photo-carriers is reduced. Reducing recombination and back reactions in turn improved the electron collection efficiency and thus overall device performance. See, for example, U.S. patent application Ser. No. 13/560,422, which is incorporated by reference in its entirety.

Figure 3:
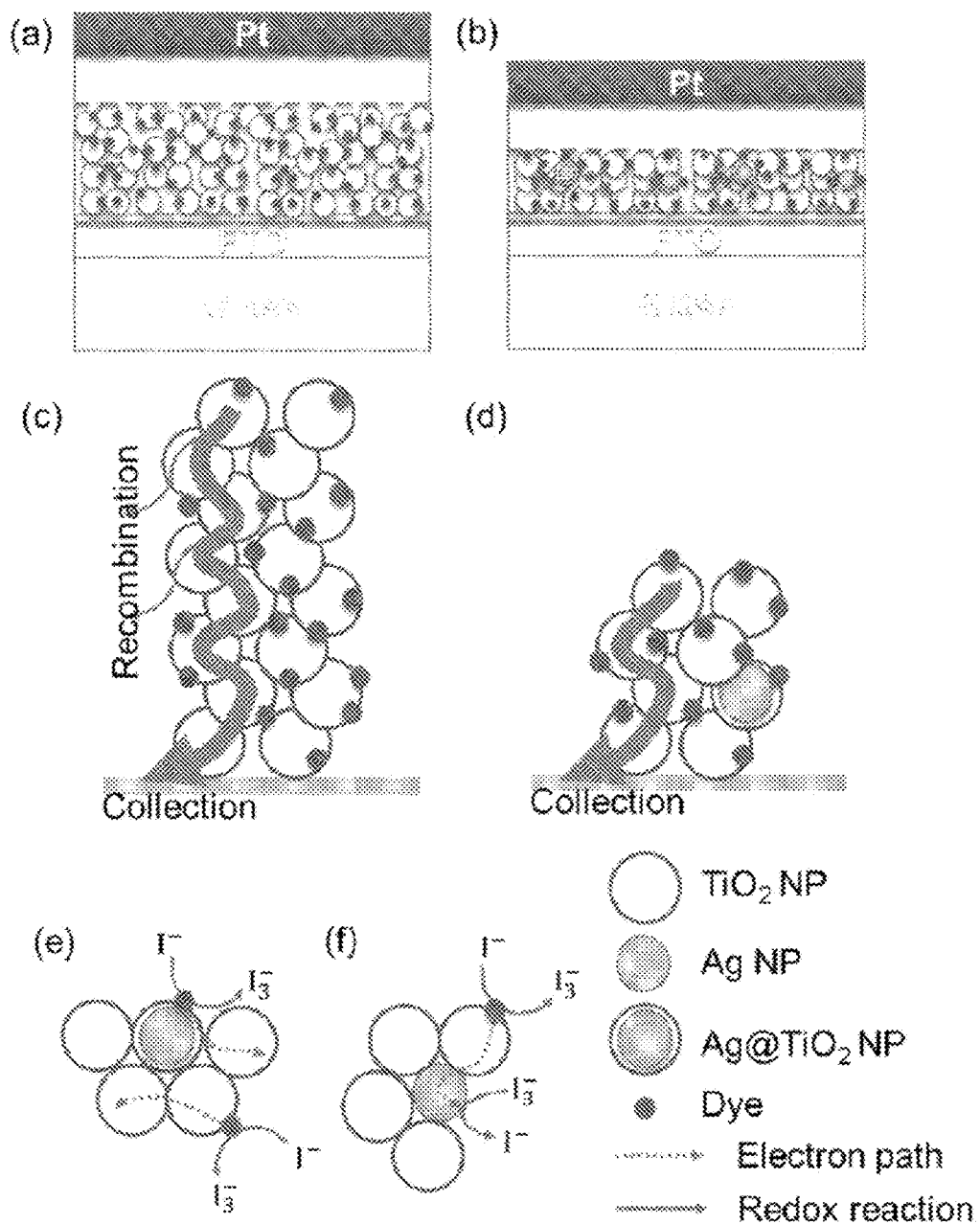
FIG. 3 illustrates device structures of conventional DSSCs (FIG. 3A) and plasmon-enhanced DSSCs (FIG. 3B).

The oxide in the plasmon-forming nanoparticle reduces the recombination and back reaction of electrons on the surface of metal nanoparticles by providing an energy barrier between metal and dye/electrolyte, as illustrated in FIG. 3E. In this situation, electrons produced by light absorption can be collected and contribute to device operation. Compare FIG. 3F, where a metal nanoparticle without an oxide on the surface makes non-productive electron transfers from $I^-$, through the $TiO_2$ and the metal nanoparticles, and ultimately reducing $I_3^-$. The situation in FIG. 3F results in light absorption without electron collection. The outer oxide shell can also protect the metallic inner shell from etching by the electrolyte.

DSSCs incorporating the nanostructures can have a PCE greater than comparable DSSCs which lack the nanostructures, particularly for DSSCs having thin photoanodes (e.g., no greater than 20 μm thick, no greater than 15 μm thick, no greater than 10 μm thick, no greater than 5 μm thick, or thinner). In particular, DSSCs incorporating the nanostructures can take better advantage of the full spectrum in converting light to electricity, e.g., can be panchromatic DSSCs. The DSSC can have increased efficiency when the nanostructures are present in only a small amount (e.g., no greater than 5 wt %, no greater than 2 wt %, or no greater than 1 wt %, relative to the amount of photoanode material). Furthermore, that increased efficiency can be achieved with a thinner photoanode than a comparable DSSC which lacks the nanostructures. A thinner photoanode can provide more effective electron collection within the device. The DSSCs including the nanostructures can achieve similar levels of efficiency as those lacking the nanostructures, while requiring less material in construction.

EXAMPLES

Materials and Methods

Materials.

Sodium citrate, silver nitrate ($AgNO_3$), tetra chloroauric acid ($HAuCl_4$), acetic acid, hydroxylamine ($NH_2OH$), titanium tetrachloride ($TiCl_4$), ethyl cellulose, terpineol, acetonitrile, turt-butanol, 1-butyl-3-methylimidazolium iodide, iodine, guanidinium thiocyanate, 4-tert-butyl pyridine, and valeronitrile are purchased from Sigma Aldrich. Titanium isopropoxide (TPO, 97%), titanium butoxide (TBO), polyvinylpyrrolidone with an average molecular weight of 8,000 (PVP-8) and poly (allylamine hydrochloride) (PAM) were purchased from Alfa; ethanol (99.5%), acetone (99.5%), nitric acid (70%), and ethylene glycol (99.9%) were purchased from Mallinckrodt Chemicals; ammonia (28-30 wt % $NH_3$ in water) was purchase from VWR International Inc. Poly(acrylic acid) (PAA, average molecular weight 5,000, 50% aqueous solution) was obtained from Polysciences, Inc. Cis-diisothiocyanato-bis(2,2'-bipyridyl-4,4'-dicarboxylato) ruthenium(II) bis(tetrabutylammonium) (also named N719 or Ruthenizer 535-bisTBA, purchased from Solaronix) was used as a 0.5 mM solution in acetonitrile and tert-butanol (volume ratio=1:1). All chemicals were used as received. All water was deionized (18.2 MΩ, milli-Q pore)

Synthesis of AgT Nanoparticles.

Ag nanoparticles of average diameter of 15 nm were synthesized by a modified polyol process. Typically, 0.1 mmol of silver nitrate was added into 25 ml of ethylene glycol solution containing 0.5 g of PVP-8 and the mixture was kept stirring at room temperature till silver nitrate was completely dissolved. Then the solution was slowly heated up to 120° C. and kept at the temperature for 1 hour with constant stirring. After the reaction, 12.5 mL of the as synthesized Ag nanoparticles in ethylene glycol (containing 0.05 mmol of Ag) was added with 5 mL of 1% PAA aqueous solution. The solution was kept stirring for over 4 h and then 100 mL acetone added and centrifuged at 3,000 rpm. Then the supernatant was removed and the Ag nanoparticles were washed again with ethanol, and centrifuged at 10,000 rpm.

The Ag nanoparticles were then redispersed in 25 mL ethanol. After cooling down the solution with ethylene glycol-dry ice bath, 1 mL of ethanol solution containing 10 μL of TBO was added into the solution. The reaction was kept stirring in the dark for 1 hour, and then sonicated in a bath sonicator for 30 min, after which the reaction was kept stirring in the dark for a certain time to achieve the desired $TiO_2$ shell thickness (typically 12 hours).

Synthesis of AuT Nanoparticles.

100 mL of 0.01% $HAuCl_4$ solution in a 300 mL round-bottom flask was brought to boiling with vigorous stirring. 1.8 mL of 1% sodium citrate was added to the solution. The solution color turned to blue within 25 s; and to red-violet 70 s later. The reaction was kept boiling for another 30 min; then the solution was stirred for another 15 min while the heating source was removed. TEM indicated an average diameter of 15 nm for the Au nanoparticles. To the as-synthesized solution, 5 mL of 5% PVP aqueous solution was added and kept stirring for 12 hours. Then, after centrifuging the reaction at 18,000 rpm, the supernatant was removed and the Au nanoparticles were washed with ethanol and centrifuged again.

The Au nanoparticles were redispersed into 25 mL of ethanol and used for synthesis of AuT core-shell structure. After cooling down the solution with ethylene glycol-dry ice bath, 1 mL of ethanol solution containing 10 μL of TBO was added into the solution. The reaction was kept stirring in the dark for 1 hour, and then sonicated in a bath sonicator for 30 min, after which the reaction was kept stirring in the dark for a time to achieve the desired $TiO_2$ shell thickness (typically 12 hours).

Synthesis of $TiO_2$ Nanoparticles.

The 15-20 nm sized $TiO_2$ nanocrystals were synthesized according to known methods. An amount of 12 g (0.2 moles) of acetic acid was added all at once to 58.6 g (0.2 moles) of titanium isopropoxide under stirring at room temperature. The modified precursor was stirred for about 15 min and poured into 290 mL water as quickly as possible while vigorously stirring (700 rpm). A white precipitate was instantly formed. One hour of stirring was required to achieve complete hydrolysis. After adding 4 mL of concentrated nitric acid, the mixture was heated from room temperature to 80° C. within 40 min and kept at that temperature for 75 min. Water was then added to the cooling liquid mixture to adjust the volume to 370 mL. The resultant mixture was kept in a 570 mL titanium autoclave and heated at 250° C. for 12 h. Following this step, 2.4 mL of 70% nitric acid was added and the dispersion was sonicated to re-disperse in water.

Synthesis of TAuT Nanoparticles.

The as-synthesized $TiO_2$ nanoparticles were dispersed in DI water and were positively charged because of the $H^+$ termination. The surface of the nanoparticle was modified by layer-by-layer (LbL) coating of polyelectrolytes (refs. 53-56). To 50 mL of 5 mM $TiO_2$ nanoparticles aqueous solution, 10 ml of 5% PAA solution was added in order to modify the nanoparticles with a negatively charged polyelectrolyte and incubated for 6 hours at room temperature with stirring. The dispersion was then precipitated by centrifugation at 12,000 r.p.m. and redispersed in DI water (repeated three times) to remove excess PAA. To modify the nanoparticles with a positively charged polyelectrolyte layer, to PAA-coated nanoparticle aqueous solution, 10 ml of 5% PAH aqueous solution was added and incubated for 12 hours at room temperature with stirring. The nanoparticles were then centrifuged and redispersed in DI water to remove excess polyelectrolyte (repeated three times). Sequentially, another PAA and PAH layers were coated by repeating incubation, precipitation and dispersion in DI water. LbL modified nanoparticles were characterized by dynamic light scattering, and zeta-potential measurements. 50 mL of the aforementioned solution containing 100 µmol $TiO_2$ and 3 ml of 1% $HAuCl_4$ were mixed and diluted with DI water to 100 mL. The $HAuCl_4$ precursor was incubated with the PAA/PAH/PAA coated particles for more than 6 hours for complexation and immobilization on the particle surface at room temperature. Then, the flask of solution was immersed in acetone-iced water bath and the solution was allowed to cool down. Subsequently, 5% hydroxylamine aqueous solution was added dropwise to initiate the surface confined growth of the gold-shell. After the reaction, 10 ml of 5% PAA aqueous solution was added in the solution and incubated more than 4 hours.

The gold shell encapsulated $TiO_2$ nanoparticles (TAu) were thus obtained, and were centrifuged, washed and redispersed in 25 mL of ethanol for coating of $TiO_2$ outer shell. After cooling down the solution with ethylene glycol-dry ice bath, 1 mL of ethanol solution containing 10 µL of TBO was added into the solution. The reaction was kept stirring in the dark for 1 hour, and then sonicated in a bath sonicator for 30 min, after which the reaction was kept stirring in the dark for a time to achieve the desired $TiO_2$ shell thickness (typically 12 hours).

Calculation of Plasmonic Nanoparticle Concentration.

For all of $TiO_2$ (3.9 g $cm^{-3}$ of density), Ag (10.5 g $cm^{-3}$ of density), and Au (19.3 g $cm^{-3}$ of density) core nanoparticles, the particle concentrations were estimated by assuming complete reaction for the synthesis of core particles, a uniform distribution of ~15 nm diameter particles. An estimated yield of 80% was used when considering the loss during washing and centrifugation steps after the nanoparticles were coated to form TAuT, AgT, and AuT (multiple-) core-shell nanoparticles.

The plasmonic AgT nanoparticle-$TiO_2$ ratios in the photoanodes were from 0.01-1.0 wt %, which corresponds to a volume density of 0.003-0.3 vl % and a particle density of $8.4*10^{12}$-$8.4*10^{14}$ $cm^{-3}$, assuming that the porosity of $TiO_2$ photoanodes was 0.60, as demonstrated in the literature using the same composition of $TiO_2$ paste (including 9 wt % ethyl cellulose as binders and 73 wt % terpineol as solvent).

The total number of NPs was calculated by $$\text{total \# of } NPs = \frac{\text{total \# of moles}}{\text{\# of mole per } NP} = \frac{\text{concentration} \times \text{volume}}{\left(\frac{4}{3}\right)\pi r^3 \times \frac{d}{M_w}}.$$

In the above equation, r is the radius of the nanoparticle, d is the density, and $M_w$ is the molecular weight.

Subsequently, for AuT and TAuT nanoparticles, the ranges of plasmonic particle densities in $TiO_2$ photoanodes were chosen to be the same as AgT-incorporated photoanodes. Considering the different densities of Ag, Au, and TAu nanoparticles, the Au—$TiO_2$ and TAu—$TiO_2$ ratios in the photoanodes were 0.018-1.8 wt % and 0.032-3.2 wt %, respectively. For the volume density, AuT nanoparticles had the same range with AgT nanoparticles; considering a TAuT nanoparticle with $1_{Au}$=3 nm and $1_T$=2 nm, the volume density of TAuT NPs in the photoanode was 0.0069-0.69 vl %. There exists a factor of 2 to 3 comparing the volume densities of TAuT and AgT or AuT nanoparticles, due to the different core radius and shell thickness. We believe that this was not responsible for the different device performance observed, simply because, even for the same concentration of different plasmonic nanoparticles, the different device performance still existed.

Other Geometries of Plasmonic Nanoparticles.

Silver nanocubes and gold nanocages were synthesized using previously published methods (refs. 45, 57). The gold nanorods (10 nm in diameter and different aspect ratios to achieve $\lambda_{LSPR}$ between 700 to 800 nm) were purchased from Strem Chemicals, Inc.

TEM Characterization of Nanoparticles.

TEM observations of the synthesized nanostructures ($TiO_2$, Ag, Au, AgT, AuT, TAu, and TAuT) were performed using JEOL 2010, JEOL 2010F, and JEOL 2100F TEMs with an accelerating voltage of 200 kV. TEM samples were prepared by directly dropping nanoparticle solution to carbon supported copper or nickel grids. To get better contrast image, the high contrast objective aperture was used for all images. The high resolution image was taken under smaller illumination area size by changing the alpha selector. The STEM images were taken by both Gatan High-Angle Annular Dark Field (HAADF) and Bright filed (BF) detectors under 0.2 nm probe size and 12 cm camera length. The X-Max 80 $mm^2$ EDX system and Inca software of Oxford Company was used for chemical analysis. For the thermal stability observation, the grids with nanoparticles were heated at 450 to 500° C. for 15 to 30 minutes in argon atmosphere and followed by fast quenching.

Zeta-Potential Measurement of Alternating Polymer PAA and PAH-Coated $TiO_2$.

Zeta-potential were measured at an accumulation time of 10 with 5 measurements per sample at 20 V using DelsaNano (Beckman Coulter). Electrophoretic mobility was calculated using the Smoluchowski approximation.

Optical Absorption Measurements.

For both solutions and thin films of AgT, AuT, and TAuT nanoparticles, the optical absorption measurements were performed using a Beckman Coulter DU800 UV-Vis spectrophotometer. One micrometer-thick films of $TiO_2$ nanoparticles or $TiO_2$ nanoparticles incorporated with plasmonic nanoparticles on 2.5×2.5 $cm^2$ fused silica wafers were used for thin-film optical absorption measurements, which were prepared by spin coating (Specialty Coating Systems, 6800 spin coater) and followed by annealing at 500° C. for 15 min. Then the film thickness was measured using a Dektak 150 surface profiler. These films were immersed into 0.1 mM ruthenium dye solution (volume ratio of acetonitrile to tert-butanol is 1:1) and kept at room temperature for 12 h. Then the dyed films were immersed in acetonitrile for 5 min to remove nonadsorbed dye.

Preparation of $TiO_2$ Paste for Spin-Coating and Doctor-Blading.

Two kinds of pure ethyl cellulose (EC) powders, i.e., EC (5-15 mPas) and EC (30-50 mPas) were dissolved prior to usage in ethanol to yield 10 wt % solutions. 4.5 g of EC (5-15) and 3.5 g of EC (30-50) of these 10 wt % ethanol solutions were added to a round bottom flask containing 1.6 g pure $TiO_2$ (obtained from previously prepared precipitate) and 6.5 g of terpineol and diluted with 8 ml of ethanol to obtain a final total volume of 28 ml. This mixture was then sonicated using an ultrasonic horn. Ethanol and water were removed from these TiO$_2$/ethyl cellulose solutions by rotary-evaporator. The final doctor-blading pastes correspond to 18 wt % TiO$_2$, 9 wt % ethyl cellulose and 73 wt % terpineol. For each doctor-blading process using the scotch-tape, a film of 5-7 μm was formed.

To achieve the spin-coating paste, the doctor blading paste was diluted by terpineol for 2 to 3 times. By adjusting the spin-coating speed from 1000 to 3000 r.p.m., the film thicknesses from 3 to 1 μm were obtained.

Fabrication of Photoanodes of DSSCs.

The FTO glass (TEC15 2.2 mm thickness, 15Ω/□, Pilkington, USA) was first cleaned in a detergent solution using an ultrasonic bath for 15 min, and then rinsed with water and ethanol. After treatment in an air plasma system for 1 min, the FTO glass plates were immersed into a 40 mM aqueous TiCl$_4$ solution at 80° C. for 30 min and washed with water and ethanol. The fabrication of the 1.5-3 μm thick photoanodes of both TiO$_2$-only DSSCs and plasmon-enhanced DSSCs was performed by spin coating, the same method used for preparing thin films for optical absorption measurement.

A layer of paste was coated on the FTO glass plates by doctor blading, left for 3 min to reduce the surface irregularity of the paste, and then dried for 5 min at 120° C. This doctor blading procedure with paste (coating, storing, drying, and annealing) was repeated to get an appropriate thickness about 5-20 μm for the photoanodes. The photoanodes were sintered at 500° C. for 30 min after the desired thicknesses of photoanodes was achieved. The TiO$_2$ film was then treated with 40 mM TiCl$_4$ solution at 80° C. for 30 min again, rinsed with water and ethanol, and then sintered again at 500° C. for 30 min. After cooling to 80° C., the TiO$_2$ electrode was immersed into a 0.5 mM N719 dye (Solaronix) in a mixture of acetonitrile and tert-butyl alcohol (volume ratio, 1:1), and kept at room temperature for 24 hours. The photoanodes incorporating plasmonic nanoparticles were fabricated with a modified procedure. The different amounts of AgT, AuT, and TAuT nanoparticles in ethanol solution (ratio of plasmonic nanoparticles-to-TiO$_2$ nanoparticles ranging from 0.01 wt % to 1 wt %) were mixed with TiO$_2$ paste (mixture of TiO$_2$ nanoparticles, ethyl celluloses, and terpineol), followed by stirring and sonicating. Then the ethanol was removed by a rotary-evaporator. After the paste incorporated with plasmonic nanoparticles was achieved, the fabrication procedure of the photoanodes of plasmon-enhanced DSSCs was the same as that of the TiO$_2$-only DSSCs.

Assembly of DSSCs with Photoanodes, Electrolyte, and Counter Electrodes.

The counter electrode was 100-nm-thick platinum, sputtered on ITO substrate (Delta Technologies). The electrolyte was a solution of 0.6 M 1-butyl-3-methylimidazolium iodide (Sigma Aldrich), 0.03 M I$_2$ (Sigma Aldrich), 0.10 M guanidinium thiocyanate (Sigma Aldrich) and 0.5 M 4-tert-butyl pyridine (Sigma Aldrich) in a mixture of acetonitrile and valeronitrile (volume ratio, 85:15). The dye-adsorbed TiO$_2$ photoanodes and Pt counter electrodes were assembled into a sandwich type cell and sealed with a hot-melt surlyn of 25 mm in thickness (Solaronix). The size of the TiO$_2$ electrodes used was 0.16 cm$^2$ (4 mm×4 mm). The aperture of the Surlyn frame was larger than that of the TiO$_2$ area by 2 mm. Copper tape was adhered on the edge of the FTO outside of the cell. The position of the tape was 1 mm away from the edge of the Surlyn gasket and 4 mm away from the edge of the TiO$_2$ layer. Masks made of black plastic tape were used to block the light coming through inactive part of the FTO substrates.

Characterization of DSSCs.

Photovoltaic measurements were performed under illumination generated by an AM 1.5 solar simulator (Photo Emission Tech.). The power of the simulated light was calibrated to 100 mW/cm$^2$ by using a reference Si photodiode with a powermeter (1835-C, Newport) and a reference Si solar cell in order to reduce the mismatch between the simulated light and AM 1.5. The J-V curves were obtained by applying an external bias to the cell and measuring the generated photocurrent with a Keithley model 2400 digital source meter. The voltage step and delay time of the photocurrent were 10 mV and 40 ms, respectively. A black tape mask was attached to the device in order to prevent irradiation from scattered light.

Spectral Response of Incident Photon-to-Current Conversion Efficiency (IPCE).

IPCE spectra were measured with a commercial IPCE measurement system (Model QEX7, PV Measurements, Inc.). Under full computer control, light from a xenon arc lamp (150 W) was focused through a grating monochromator, equipped with two 1200 g/mm diffraction gratings, onto the photovoltaic cell under test. The monochromator was incremented through the visible spectrum (from 350 nm to 850 nm) to generate the spectral response of IPCE with a spectral resolution of 10 nm. The incident photon flux was determined using a calibrated silicon photodiode (calibrated by PV Measurements, Inc.). Measurements were performed in a short-circuit condition, while the cell was under background illumination from a bias light of 50 mW/cm$^2$. Bias illumination was from the same direction as the monochromatic light, which was from the FTO side. The monochromatic beam was chopped using a computer-controlled shutter at a frequency of 1.33 Hz, and averaging of up to 10 shutter cycles was employed.

Electrochemical Impedance Spectroscopy (EIS).

Electrochemical impedance spectra measurements of DSSCs were performed with a Solartron 1260 frequency response analyzer. The spectra were measured at various forward bias voltages (from −0.85 to −0.45 V) in the frequency range of 0.1 Hz-1 MHz with oscillation potential amplitudes of 10 mV at room temperature. The photoanode was connected to the working electrode. The Pt electrode was connected to the auxiliary electrode and the reference electrode. The impedance measurements were carried out in dark conditions.

Derivation of the Enhancement Factor.

In order to arrive at an enhancement factor, the electric-field intensity of the enhanced near field was integrated by fixing the nanoparticle core diameter as the characteristic length scale and considering the field contained within a two-diameter sphere and then divided by the electric-field of the incident light over this same volume when the nanoparticle was absent. While the nanoparticle was present, the EM intensity inside the nanoparticle was considered to be zero, because no dye-molecules can access this space. The EM intensity of the remaining space in the two-diameter sphere was calculated from the finite-difference time-domain simulation. In summary, Enhancement Factor($\lambda$) =

$$\frac{|E|^2_{int}}{|E_0|^2_{int}}(\lambda) = \int_0^{2\pi}\int_0^{\pi}\int_0^{2R} \frac{|E(r,\theta,\phi,\lambda)|^2}{|E_0(r,\theta,\phi,\lambda)|^2} r^2 \sin\theta\, dr\, d\theta\, d\phi,$$

$|E(r,\theta,\phi,\lambda)|^2 = 0$ when $0 \le r \le R$ nm.

Simulated Absorption Spectra of N719 Enhanced by Plasmonic Nanoparticles with $\lambda_{LSPR}$ from 400 to 700 nm.

The simulated absorption spectra of N719 enhanced by plasmonic nanoparticles with different $\lambda_{LSPR}$ were obtained by multiplying (normalized) absorption spectrum of N719 and the enhancement factors (as a function of wavelength) at each wavelength. The enhancement factors (as a function of wavelength) were represented by the Gaussian distributions with center at 400-700 nm and full-width at half-maximum (FWHM) about 100 nm (shown next to the simulated enhanced absorption spectra of N719). The maximum enhancement factors of 2 were considered, and the enhancement factors away from $\lambda_{LSPR}$ were set to 1, i.e.

Enhancement Factor($\lambda$) = $e^{\frac{-(\lambda-\lambda_{LSPR})^2}{2000}} + 1$, where $\lambda_{LSPR} = 400 - 700$ nm.

Calculation of Electron Diffusion Length from Electrochemical Impedance Spectra.

The electron diffusion length, $L_n$, can be calculated from $L_n = (R_{REC}/R_T)^{1/2}$, where L is the film thickness, $R_{REC}$ is electron recombination resistance, and $R_T$ is electron transport resistance. $R_{REC}$ and $R_T$ were obtained by fitting the measured electrochemical impedance spectra to the equivalent circuit (known as transmission line model) with the Z-view software (v3.2b, Scribner Associates Inc (The transmission line component in an equivalent circuit is often used to represent the interface resistance and capacitance for a porous structure, which is the case for the photoanodes of DSSCs). During fitting the electrochemical impedance spectra to the transmission line model, the resistance and capacitance at the substrate/TiO$_2$ interface, and the substrate/electrolyte interface were assumed negligible due to good contact between substrate and TiO$_2$ and blocking layer of TiO$_2$, achieved by TiCl$_4$ treatment to the substrate.

Calculation of Electron Collection Efficiency from Electron Diffusion Length.

Figure 5:
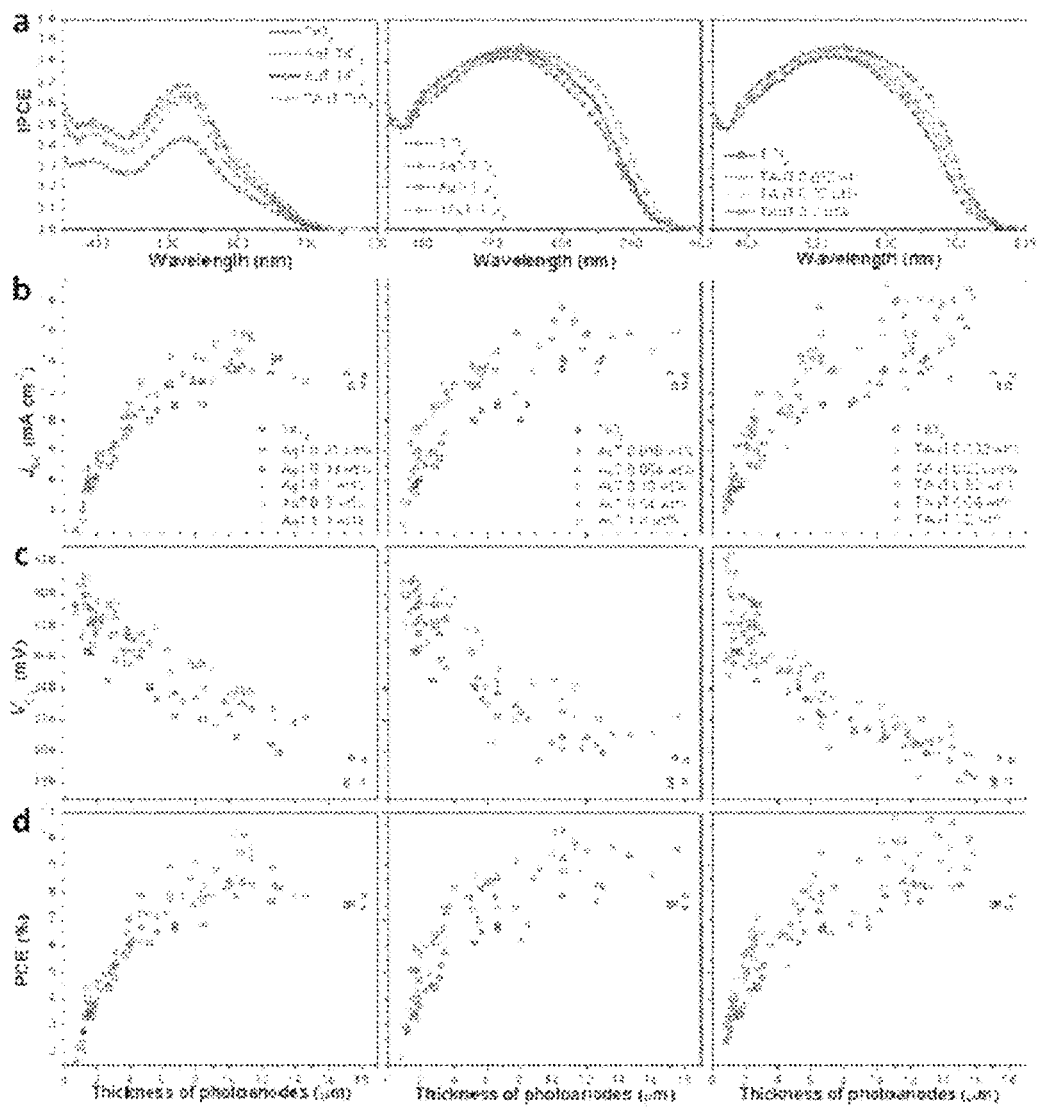
FIG. 5a shows IPCE spectra of DSSCs with AgT, AuT, and TAuT nanoparticle-incorporated photoanodes of 1.5 µm thickness, of optimized thickness (10-15 µm) for maximum PCE, and as a function of concentration of TAuT nanoparticles in optimized TAuT-DSSCs.
FIGS. 5b, 5c, and 5d show $J_{SC}$, $V_{OC}$, and PCE, respectively, of plasmon-enhanced DSSCs with AgT, AuT, and TAuT nanoparticle-incorporated photoanodes, as a function of concentration of plasmonic nanoparticles (0 to 1.0 wt %) and thickness of photoanodes (1 to 20 µm).

The electron collection efficiency is (ref. 39):

$$\eta_{COL} = \frac{\left[-L\alpha\cosh\left(\frac{d}{L}\right) + \sinh\left(\frac{d}{L}\right) + L\alpha e^{-\alpha d}\right]L\alpha}{(1-e^{-\alpha d})\cdot[1-L^2\alpha^2]\cosh\left(\frac{d}{L}\right)},$$

where d is the thickness of the TiO$_2$ film, L is the electron diffusion length, and $\alpha$ is the extinction coefficient of dye sensitized TiO$_2$ film. (The notation is different from that we used in the manuscript: we used L for the thickness of the TiO$_2$ film and $L_n$ for the electron diffusion length.) For the calculation, $\alpha d$ was assumed to equal 1, indicating 90% of the incident light was absorbed. For semiconducting SWNTs-incorporated DSSCs, L/d=8, $\eta_{COL}$=1; for DSSCs with only-TiO$_2$-nanoparticles, L/d2, $\eta_{COL}$=0.93; for metallic SWNTs-incorporated DSSCs, L/d=0.5, $\eta_{COL}$=0.54 (all L/d values were taken at a bias value of 600 mV, as shown in FIG. 5). Since the electron generation efficiency and charge separation efficiency were similar for the devices without and with different electronic types of SWNTs, the electron collection efficiency (decided by electron diffusion length) should fit to the difference of the power conversion efficiency. In fact, the calculated ratio of electron collection efficiency for semiconducting SWNTs incorporated DSSCs, DSSCs with only TiO$_2$ nanoparticles, and metallic SWNTs incorporated DSSCs is 1:0.93:0.54, and the measured power conversion efficiency ratio is 1:0.79:0.63. Therefore, the order of magnitude differences in extrapolated diffusion length account for the difference in power conversion efficiency.

Results and Discussion

Figure 4:
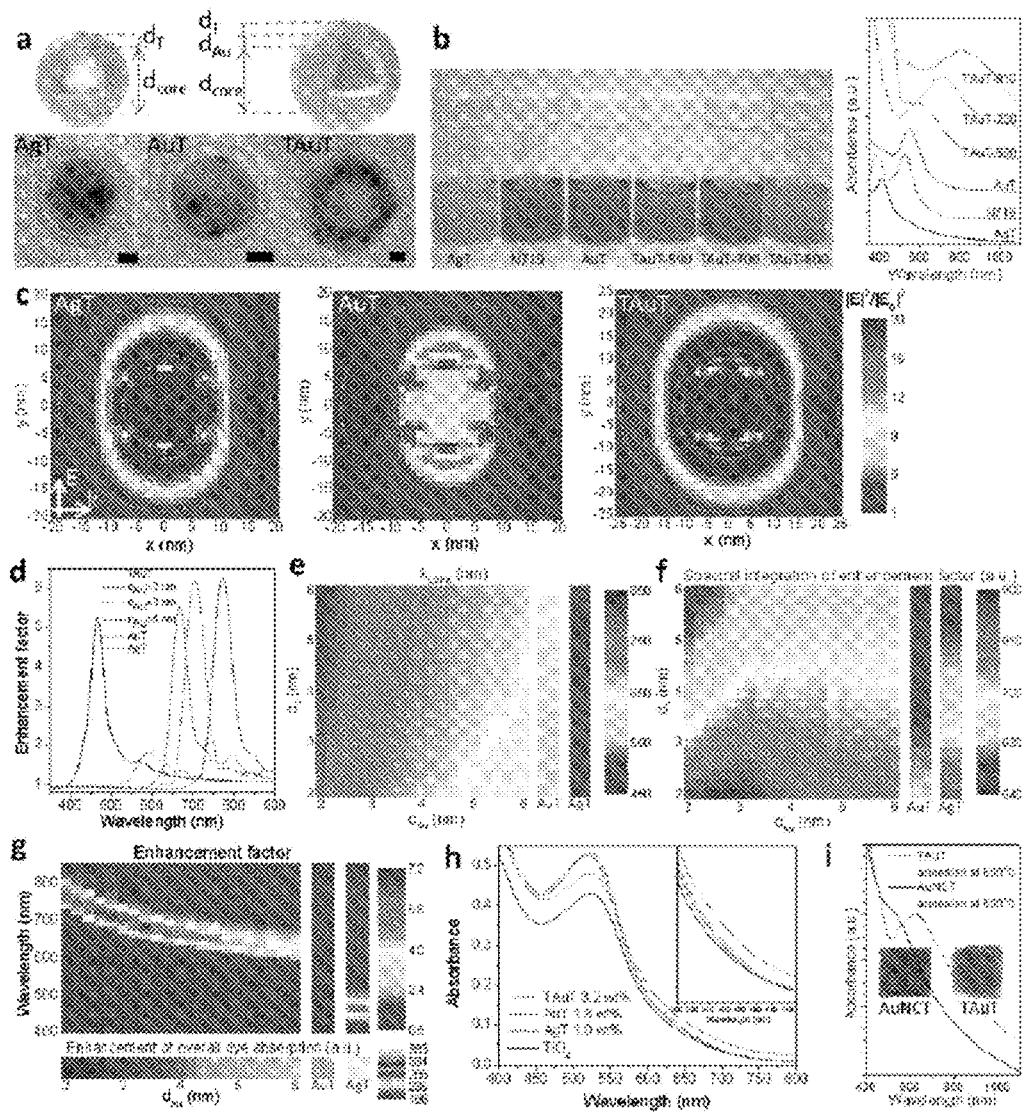
FIGS. 4a-4c illustrate the structure and optical properties of nanoparticles.
FIG. 4d shows enhancement factor as a function of wavelength for AgT, AuT, and TAuT nanoparticles with different $d_{Au}$ ($d_T$=2 nm).
FIG. 4e shows $\lambda_{LSPR}$ of AgT, AuT, and TAuT nanoparticles as a function of $d_{Au}$ (of TAuT) and $d_T$ (of AgT, AuT, and TAuT).
FIG. 4f shows spectral integration over 300-900 nm for enhancement factor as a function of $d_{Au}$ (of TAuT) and $d_T$ (of AgT, AuT, and TAuT).
FIG. 4g, top, enhancement factor as a function of wavelength for AgT, AuT, and TAuT with different $d_{Au}$ ($d_T$=2 nm); bottom, enhancement of overall dye absorption at for AgT, AuT, and TAuT with different $d_{Au}$ ($d_T$=2 nm).
FIG. 4h, absorption of N719-sensitized $TiO_2$ thin films improved by AgT, AuT, and TAuT nanoparticles.
FIG. 4i, photographs and absorption spectra of thin films of Au nanocage@$TiO_2$ (AuNCT, left) and TAuT-700 (right) on glass substrates after 500° C. annealing; after annealing, TAuT nanoparticles maintained their structural and optical properties, whereas $\lambda_{LSPR}$ of AuNCT blue-shifted toward $\lambda_{LSPR}$ of Au nanoparticles.

Synthesis and characterization of the optical properties were performed for the core-shell (core diameter-15 nm, shell thickness ~2 nm) Ag@TiO$_2$ (AgT) and Au@TiO$_2$ (AuT) and multiple-core-shell (core diameter ~15 nm, various Au inner shell thickness and oxide outer shell thickness ~2 nm) TAuT nanoparticles (FIGS. 4a-4b). FIG. 4a show illustrations and transparent electron microscope (TEM) images of AgT, AuT, and TAuT nanoparticles. The symbols $d_{core}$, $d_{Au}$, and $d_T$ represent core diameter, gold-shell thickness, and TiO$_2$-shell thickness, respectively.

For the synthesis of the gold shell of TAuT nanoparticles, Au seeds gradually covered the core and coalesced to form a continuous layer, which was stable at 500° C. (annealing condition for DSSCs). The outer TiO$_2$ shells for all plasmonic nanoparticles impeded the metals from acting as trap sites that promote recombination in the DSSCs (refs. 32, 41). The $\lambda_{LSPR}$ of AgT and AuT nanoparticles were 420 and 550 nm, respectively, and the $\lambda_{LSPR}$ of TAuT nanoparticles was tunable continuously from 1,000 to 600 nm by gradually increasing the thickness of the Au inner shell up to 4 nm (FIG. 4b). FIG. 4b shows a photograph and absorption spectra of N719, AgT, AuT, TAuT-590 ($\lambda_{LSPR}$=590 nm), TAuT-700, and TAuT-800. Thus, $\lambda_{LSPR}$ was tunable across the visible-near-infrared (vis-NIR) region.

The interaction of the nanoparticles with light was investigated using the finite-difference time-domain (FDTD) method. All plasmonic nanoparticles amplify the electromagnetic (EM) fields in the near-field zone outside the particles. See FIG. 4c, which shows contour plots of FDTD simulated EM field intensity enhancement ($|E|^2/|E_0|^2$) in near field at $\lambda_{LSPR}$ for AgT (core diameter 15 nm, shell thickness 2 nm), AuT (core diameter 15 nm, shell thickness 2 nm), and TAuT (core diameter 15 nm, Au shell thickness 2 nm, TiO$_2$ shell thickness 2 nm) nanoparticles. Therefore, surrounding dye-molecules would experience a significantly increased light intensity near the LSPR frequency (refs. 42-43), and thus a higher photon flux ($\Phi_{ph}$), which increases electron-hole pair generation. The enhancement factors (derived by integrating over space surrounding nanoparticles) of AgT, AuT, and TAuT nanoparticles as a function of wavelength (FIG. 4d) showed similar results for $\lambda_{LSPR}$ to those measured from absorption spectra. The characteristic absorption peak of the TAuT nanoparticles originated from the LSPs arising in the gold nanoshell structure (ref. 44, 50-52). By tuning the thicknesses of the Au inner shell and TiO$_2$ outer shell of TAuT nanoparticles in the range of 2-6 nm, $\lambda_{LSPR}$ of 600-800 nm was predicted, in good agreement with the experimental results. As expected, thinner gold and thicker TiO$_2$ shells resulted in longer $\lambda_{LSPR}$ (FIG. 4e). Furthermore, the enhancement factor at $\lambda_{LSPR}$ and that integrated over 300-900 nm show that an optimum Au inner shell thickness ~3 nm maximized the enhancement and thicker TiO$_2$ shells tended to weaken the enhancement (FIG.

4f). These results represented the intrinsic properties of plasmonic nanoparticles and did not take photo-absorption spectra of dye into account.

Furthermore, the impact of LSP on the photo-absorption of surrounding dye-molecules was analyzed by simulating the enhancement factors of TAuT nanoparticles at different wavelengths (wavelength regions) (FIG. 4g). The greatest enhancement for dye absorption at $\lambda_{Lo}$=700 occurred in a region of the contour plot corresponding to $\lambda_{LSPR}$~700 nm (e.g., TAuT nanoparticles with Au outer shell thickness ~3 nm and TiO$_2$ inner shell thickness ~2 nm). In contrast, the enhancement factor integrated over 300-900 nm weighted by N719 absorbance spectra presented maximum improvement using thick Au shells, whose $\lambda_{LSPR}$ matches $\lambda_{Hi}$. These results and the simulated absorption spectra of N719 enhanced by plasmonic nanoparticles with $\lambda_{LSPR}$=530 and 700 nm suggested that, on the level of individual plasmonic NANOPARTICLE, matching $\lambda_{LSPR}$ with $\lambda_{Hi}$ enhanced overall LH of N719 more effectively, whereas matching $\lambda_{LSPR}$ with $\lambda_{Lo}$ balanced LH of N719 at different wavelengths.

The effect of tunable LSP on LH of sensitized mesoporous 1 μm thick TiO$_2$ films was investigated. Plasmonic nanoparticles greatly improved LH of thin films, which was ascribed to the interaction between dye-molecular dipoles and the enhanced near-field EM intensity and enhanced scattering cross-section of the nanoparticles induced by LSPs. AgT and AuT nanoparticles improved LH mostly around $\lambda_{Hi}$ of N719, slightly changing absorption spectral shape. TAuT nanoparticles, however, increased LH around $\lambda_{Lo}$, resulting in balanced LH and broadened absorption spectra. Moreover, the enhancements of simulated EM field and LH of thin films were similar around $\lambda_{LSPR}$, confirming the LH improvement stemmed from LSP-enhanced EM field.

The multiple-core-shell oxide-metal-oxide plasmonic nanoparticles can be advantageous over other geometries (e.g. nanorods, nanodisks, and hollow nanoshells) which also possess tunable $\lambda_{LSPR}$ in red-NIR region (refs. 44-45). The TAuT nanoparticles maintained their geometric and plasmonic properties after thermal treatment due to the rationally-designed templated metal-shell structure, while the characteristic $\lambda_{LSPR}$ of other geometries blue-shifts when the materials are thermal-treated and melt to spheres or spheroids (FIG. 4i), and the ability to enhance LH at $\lambda_{Lo}$ is severely reduced. Moreover, simulations indicated that TAuT nanoparticles possessed larger EM field enhancement than other geometries. For a 15 nm diameter TiO$_2$ core, tuning the gold shell thickness from about 1 nm to 4 nm has achieved $\lambda_{LSPR}$ of 1000-600 nm, which did not require much change for the synthesis. However, for gold nanorods, tuning the $\lambda_{LSPR}$ from 550 nm to 800 nm required the aspect ratio of the nanorods changing from 1 to 4, which involved more sophisticated synthesis and more geometric modification than simply changing the gold shell thicknesses in the TAuT nanoparticles. For Au nanoplates with cylindrical or triangular shapes, the synthesis can be more complicated.

To study the spectral response of tunable LSP-enhanced DSSCs, different plasmonic nanoparticle-incorporated TiO$_2$ photoanodes (thickness of 1-20 μm and plasmonic nanoparticle-TiO$_2$ ratio of 0.01-1.0 wt %) were assembled into DSSCs (refs. 41, 46). The 1.5 μm thin photoanodes revealed the impact of LSP on incident photon-to-current conversion efficiency (IPCE) in vis-NIR. AgT, AuT, and TAuT nanoparticles increased the IPCE at $\lambda_{max}$ (maximum absorption wavelength ~530 nm for N719) by 45%, 60%, and 50%, respectively (FIG. 5a). Enhancement was maximized when $\lambda_{LSPR}$ was closest to $\lambda_{max}$. Similarly, at 700 nm, TAuT-700 nanoparticles ($\lambda_{LSPR}$=700 nm) increased IPCE the most—by 80%—whereas AgT and AuT nanoparticles enhanced IPCE only by 21% and 22%, respectively, due to the large mismatch between $\lambda_{LSPR}$ and $\lambda_{Lo}$. It is worth noting that optical density, LH efficiency, and IPCE were all correlated. In fact, the matching experimental results of optical density and IPCE enhancement indicated that the IPCE improvement mainly arose from LSP-enhanced LHE.

While IPCE (specifically LHE) of thin photoanodes was readily increased by LSPs, thicker photoanodes (~10-15 μm) for practical devices are required to ensure balanced LH and carrier collection for maximized PCE (ref. 47). At optimized thicknesses of photoanodes, the LHE of $\lambda_{Hi}$ and internal quantum efficiency are close to unity (ref. 47). At $\lambda_{max}$, less than 5% enhancement of IPCE for all plasmonic nanoparticles is observed (FIG. 5a). In contrast, at $\lambda_{low}$, the TAuT nanoparticles increased IPCE by up to 100%, whereas AgT and AuT nanoparticles increased IPCE slightly due to large mismatch between $\lambda_{LSPR}$ and $\lambda_{Lo}$. Moreover, the IPCE at $\lambda_{Lo}$ increased monotonically with the concentration of TAuT nanoparticles (FIG. 5a). The different results of IPCE enhancement for thin and thick photoanodes led to the conclusion that matching $\lambda_{LSPR}$ with $\lambda_{Hi}$ enhanced overall LH effectively for thin photoanodes, whereas matching $\lambda_{LSPR}$ with $\lambda_{Lo}$ balanced LH at different wavelengths, which benefits practical photovoltaic devices.

All AgT, AuT, and TAuT NPs improved the IPCE of optically-thick photoanodes at $\lambda_{max}$ by less than 5%. There are several possible reasons. IPCE($\lambda$)=LHE($\lambda$)CSE($\lambda$)CCE($\lambda$). For TiO$_2$-only photoanodes or LSP-photoanodes, the LHE at $\lambda_{Hi}$ (especially $\lambda_{max}$) and CCE should be balanced and close to unity. However, a slight difference still existed for the LHE and CCE due to the thinner photoanodes for optimized PCE for the following reasons. First, even for the photoanodes with the same optical density, thinner photoanodes would have less loss of incident light due to the optical absorption from electrolyte. Second, thinner photoanodes have higher CCE due to similar electron diffusion length. In addition, it is possible that the CSE was affected by plasmonic nanoparticles, due to the changed photophysical processes, e.g. increased radiative recombination rate has been observed as photoluminescence enhancement. Consequently, the IPCEs at $\lambda_{max}$ of LSP-incorporated optically-thick photoanodes were improved slightly.

There is no significant decreasing or increasing effect of the plasmonic nanoparticles on the fill factors of the DSSCs. However, compared to a more uniform distribution of the fill factors of TiO$_2$-only DSSCs, the fill factors of the DSSCs with plasmonic nanoparticles showed a similar average but more random distribution. This was probably due to the preparation of plasmonic nanoparticles-incorporated TiO$_2$ paste. Since the TiO$_2$ pastes were prepared for each condition (each type of nanoparticle, each concentration, and for doctor-blading and spin-coating) in a relatively small amount, the quality of the plasmonic nanoparticles-incorporated pastes was not as perfect as the original TiO$_2$ paste, which was prepared in a relatively large amount. This randomness in fill factor was also responsible for the slighter randomness observed for the PCEs. However, if the plasmonic nanoparticle-incorporated TiO$_2$ pastes are prepared in large quantity, this issue could be easily solved.

The PCEs of tunable LSP-enhanced DSSCs were measured, where PCE=$J_{SC}V_{OC}$FF/$P_{in}$ ($V_{OC}$, FF, and $P_{in}$ represent open-circuit voltage, fill factor, and input power density, separately). Since $$J_{SC}=q\int_{\lambda_{min}}^{\lambda_{max}} IPCD(\lambda)\phi_{ph}(\lambda)d\lambda,$$

all plasmonic nanoparticles increased $J_{SC}$ in the same way as IPCE and with increasing concentrations of nanoparticles; the largest $J_{SC}$ was achieved by incorporating 1.0 wt % TAuT nanoparticles (FIG. 5b). Besides extended harvested solar spectrum, thinner photoanodes for optimized PCE improved charge collection due to unchanged electron diffusion length (the optimized thicknesses for TiO$_2$, AgT, AuT, and TAuT DSSCs were 13.2, 10.9, 10.3, and 11.0 μm, respectively).

Additionally, introducing plasmonic nanoparticles increased $V_{OC}$ (FIG. 5c). Generally, $V_{OC}$ is limited by the material properties of electronic structure (e.g., the quasi-Fermi level of TiO$_2$ and redox potential of electrolyte in DSSCs); enhancing $V_{OC}$ usually requires exploiting new materials (ref. 35). Two possible reasons exist for LSP-induced $V_{OC}$ enhancement: the voltage loss from dark current is reduced because of thinner photoanodes for optimized PCE:

$$V_{QC} = \frac{nk_BT}{q}\ln\left(\frac{J_{SC}}{J_D}+1\right);$$

for photoanodes of the same thickness, the increasing concentrations of plasmonic nanoparticles were still responsible for enhancement of $V_{OC}$ presumably owing to the lifted quasi-Fermi level from equilibrium between quasi-Fermi level of TiO$_2$ and LSPR energy level of plasmonic nanoparticles (refs. 48, 49). In addition, TAuT nanoparticles increased $V_{OC}$ less significantly than AgT and AuT nanoparticles did, probably due to smaller metal-TiO$_2$ ratio. The different $V_{OC}$ enhancement from various plasmonic nanoparticles could help elucidate the origin of plasmon-enhanced $V_{OC}$, and the PCE would be further improved with the ability to rationally increase $V_{OC}$.

The relationship between $V_{OC}$ and the thickness of the photoanode showed that $V_{OC}$ increased with decreasing the thickness of photoanodes, which was due to less charge recombination. Since the plasmon-enhanced DSSCs featured thinner photoanodes for optimized PCE due to the enhanced light harvesting ability, the $V_{OC}$ of the optimized plasmon-enhanced DSSC was thus larger than the $V_{OC}$ of the optimized DSSCs without plasmonic nanoparticles.

In terms of the material properties of electronic structure, the $V_{OC}$ of a DSSC was determined by the difference between the quasi-Fermi level of TiO$_2$ and the redox potential of electrolyte. By introducing plasmonic nanoparticles, the quasi-Fermi level was lifted from the equilibrium between quasi-Fermi level of TiO$_2$ and LSPR energy level of plasmonic nanoparticles. The ground states of the electrons in plasmonic nanoparticles were the Fermi level, and the work functions for Ag and Au are 4.7 eV and 5.1 eV, respectively. Considering that the energy difference between the ground state and the surface plasmon state of the electrons was provided by the photo-excitation, this energy difference was 3.0 eV, 2.3 eV, and 1.8 eV, corresponding to 420 nm, 550 nm, and 700 nm of $\lambda_{LSPR}$ for AgT, AuT, and TAuT nanoparticles, respectively. Therefore, AgT, AuT, and TAuT nanoparticles have the highest to lowest LSPR energy levels, which could be responsible for that the TAuT nanoparticles increased $V_{OC}$ less significantly than AgT and AuT nanoparticles. In addition, the different interfaces of metal-TiO$_2$ and different recombination rates induced by metal particles could also be related to the different $V_{OC}$ enhancement.

Figure 6:
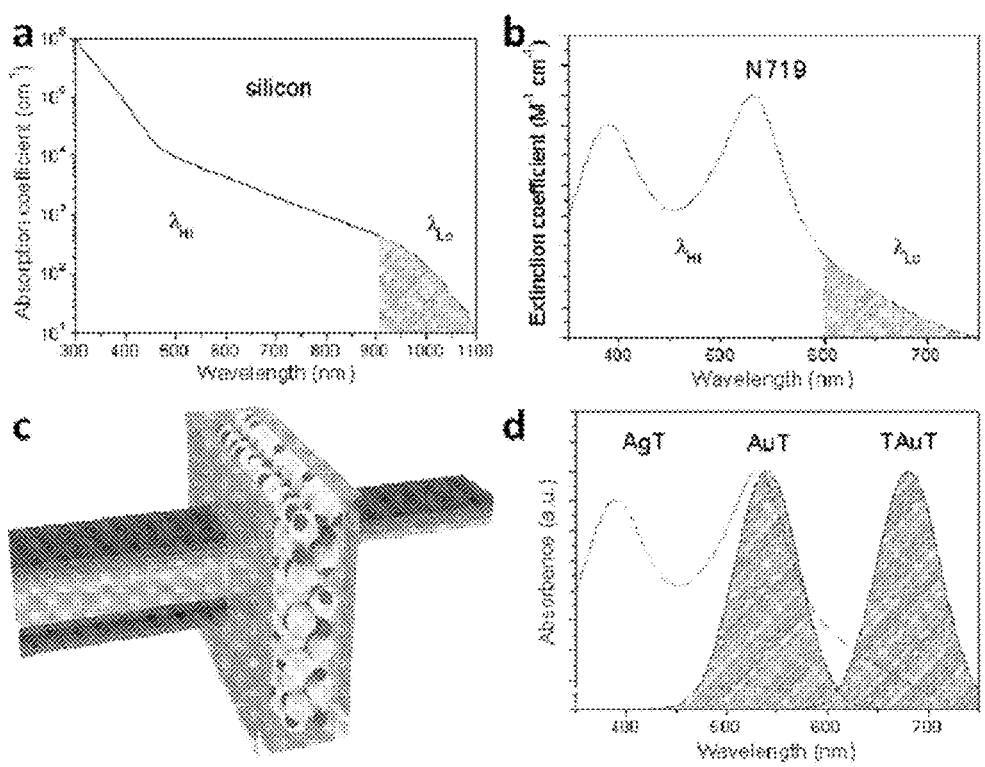
FIGS. 6a-6b illustrate the absorption coefficient of bulk silicon (FIG. 6a) and extinction coefficient of N719 (FIG. 6b); the shaded areas are low LH regions, which require thicker photoactive layers to achieve high LHE.
FIG. 6c shows a schematic of the spectral response of a solar cell. The solar energy is less utilized in $\lambda_{Lo}$ of LH materials (usually red-NIR).
FIG. 6d shows illustrations of enhancement of EM intensity as a function of wavelength for AgT (yellow), AuT (purple), and TAuT (blue) plasmonic NPs. $\lambda_{LSPR}$ of AgT and AuT overlaps with $\lambda_{Hi}$ of N719, maximizing the effect of plasmon-enhanced LH. $\lambda_{LSPR}$ of TAuT matches $\lambda_{Lo}$ of N719, balancing LH at different wavelengths.

Since LSPs had a larger effect on enhancing LH than changing $V_{OC}$ and FF did, all plasmonic nanoparticles improved the PCE with increasing concentrations of nanoparticles (in the range of 0-1.0 wt %; higher amount of plasmonic nanoparticles could reduce performance) and in a similar way to IPCE and $J_{SC}$ (FIG. 5d), achieving maximum PCEs of 10.1%, 10.3%, and 10.8% for AgT, AuT, and TAuT nanoparticle-incorporated DSSCs, respectively. The optimized overall device performance facilitated the comparison of the effective improvement from different plasmonic nanoparticles. AgT and AuT nanoparticles here as well as in previous studies (refs. 32, 41, 42, 48) on LSP-enhanced DSSCs improved IPCE and PCE by matching $\lambda_{LSPR}$ with $\lambda_{Hi}$, through improved LHE mainly around $\lambda_{Hi}$, carrier collection and $V_{OC}$. However, this approach could not break the compromise imposed by unbalanced LH at $\lambda_{Hi}$ and $\lambda_{Lo}$. In contrast, the strategy of matching $\lambda_{LSPR}$ of TAuT nanoparticles with $\lambda_{Lo}$ balanced and optimized LH in a broad spectrum range (FIG. 6d), achieved panchromatic solar energy conversion with the same dye, and further enhanced LHE, $J_{SC}$, and PCE. In fact, due to the distribution of core sizes and shell thicknesses, the broad absorption spectrum of TAuT nanoparticles with a peak at $\lambda_{Lo}$ is advantageous for both panchromatic LH and carrier collection.

REFERENCES

Each of the following references is hereby incorporated by reference in its entirety.

1. O'Regan, B.; Grätzel, M., A Low-Cost, High-Efficiency Solar Cell Based on Dye-Sensitized Colloidal TiO$_2$ Films. *Nature* 1991, 353, 737-740.
2. Nazeeruddin, M. K.; Kay, A.; Rodicio, I.; Humphry-Baker, R.; Mueller, E.; Liska, P.; Vlachopoulos, N.; Graetzel, M., Conversion of Light to Electricity by Cis-X$_2$bis (2,2'-bipyridyl-4,4'-dicarboxylate)ruthenium(II) Charge-Transfer Sensitizers (X=Cl$^-$, Br$^-$, I$^-$, CN$^-$, and SCN$^-$) on Nanocrystalline Titanium Dioxide Electrodes. *J. Am. Chem. Soc.* 1993, 115, 6382-6390.
3. Grätzel, M., Photoelectrochemical Cells. *Nature* 2001, 414, 338-344.
4. Grätzel, M., Dye-Sensitized Solar Cells. *J. Photochem. Photobiol. A: Photochem. Rev.* 2003, 4, 145-153.
5. Chen, C.-Y.; Wang, M.; Li, J.-Y.; Pootrakulchote, N.; Alibabaei, L.; Ngoc-le, C.-h.; Decoppet, J.-D.; Tsai, J.-H.; Grätzel, C.; Wu, C.-G.; Zakeeruddin, S. M.; Grätzel, M., Highly Efficient Light-Harvesting Ruthenium Sensitizer for Thin-Film Dye-Sensitized Solar Cells. *ACS Nano* 2009, 3, 3103-3109.
6. Law, M.; Greene, L. E.; Johnson, J. C.; Saykally, R.; Yang, P., Nanowire Dye-Sensitized Solar Cells. *Nature Mater.* 2005, 4, 455-459.
7. Varghese, O. K.; Paulose, M.; Grimes, C. A., Long Vertically Aligned Titania Nanotubes on Transparent Conducting Oxide for Highly Efficient Solar Cells. *Nature Nanotech.* 2009, 4, 592-597.
8. Wang, P.; Zakeeruddin, S. M.; Moser, J. E.; Nazeeruddin, M. K.; Sekiguchi, T.; Grätzel, M., A Stable Quasi-Solid-State Dye-Sensitized Solar Cell with an Amphiphilic Ruthenium Sensitizer and Polymer Gel Electrolyte. *Nature Mater.* 2003, 2, 402-407.
9. Nazeeruddin, M. K.; Bessho, T.; Cevey, L.; Ito, S.; Klein, C.; De Angelis, F.; Fantacci, S.; Comte, P.; Liska, P.; Imai, H.; Graetzel, M., A High Molar Extinction Coefficient Charge Transfer Sensitizer and its Application in Dye-Sensitized Solar Cell. *J. Photochem. Photobiol. A: Chem.* 2007, 185, 331-337.

10. Grätzel, M., Recent Advances in Sensitized Mesoscopic Solar Cells. *Acc. Chem. Res.* 2009, 42, 1788-1798.
11. Mora-Seró, I. n.; Bisquert, J., Breakthroughs in the Development of Semiconductor-Sensitized Solar Cells. *J. Phys. Chem. Lett.* 2010, 1, 3046-3052.
12. Sambur, J. B.; Novet, T.; Parkinson, B. A., Multiple Exciton Collection in a Sensitized Photovoltaic System. *Science* 2010, 330, 63-66.
13. Dang, X.; Yi, H.; Ham, M.-H.; Qi, J.; Yun, D. S.; Ladewski, R.; Strano, M. S.; Hammond, P. T.; Belcher, A. M., Virus-Templated Self-Assembled Single-Walled Carbon Nanotubes for Highly Efficient Electron Collection in Photovoltaic Devices. *Nature Nanotech.* 2011, 6, 377-384.
14. Atwater, H. A.; Polman, A., Plasmonics for Improved Photovoltaic Devices. *Nature Mater.* 2010, 9, 205-213.
15. Stuart, H. R.; Hall, D. G., Island Size Effects in Nanoparticle-Enhanced Photodetectors. *Appl. Phys. Lett.* 1998, 73, 3815-3817.
16. Schaadt, D. M.; Feng, B.; Yu, E. T., Enhanced Semiconductor Optical Absorption via Surface Plasmon Excitation in Metal Nanoparticles. *Appl. Phys. Lett.* 2005, 86, 063106-3.
17. Derkacs, D.; Lim, S. H.; Matheu, P.; Mar, W.; Yu, E. T., Improved Performance of Amorphous Silicon Solar Cells via Scattering from Surface Plasmon Polaritons in Nearby Metallic Nanoparticles. *Appl. Phys. Lett.* 2006, 89, 093103-3.
18. Pillai, S.; Catchpole, K. R.; Trupke, T.; Green, M. A., Surface Plasmon Enhanced Silicon Solar Cells. *J. Appl. Phys.* 2007, 101, 093105-8.
19. Wu, J.-L.; Chen, F.-C.; Hsiao, Y.-S.; Chien, F.-C.; Chen, P.; Kuo, C.-H.; Huang, M. H.; Hsu, C.-S., Surface Plasmonic Effects of Metallic Nanoparticles on the Performance of Polymer Bulk Heterojunction Solar Cells. *ACS Nano* 2011, 5, 959-967.
20. Westphalen, M.; Kreibig, U.; Rostalski, J.; Lúth, H.; Meissner, D., Metal Cluster Enhanced Organic Solar Cells. *Sol. Energy Mater. Sol. Cells* 2000, 61, 97-105.
21. Rand, B. P.; Peumans, P.; Forrest, S. R., Long-Range Absorption Enhancement in Organic Tandem Thin-Film Solar Cells Containing Silver Nanoclusters. *J. Appl. Phys.* 2004, 96, 7519-7526.
22. Morfa, A. J.; Rowlen, K. L.; Reilly, T. H.; Iii; Romero, M. J.; van de Lagemaat, J., Plasmon-Enhanced Solar Energy Conversion in Organic Bulk Heterojunction Photovoltaics. *Appl. Phys. Lett.* 2008, 92, 013504-3.
23. Konda, R. B.; Mundle, R.; Mustafa, H.; Bamiduro, O.; Pradhan, A. K.; Roy, U. N.; Cui, Y.; Burger, A., Surface Plasmon Excitation via Au Nanoparticles in n-CdSe/p-Si Heterojunction Diodes. *Appl. Phys. Lett.* 2007, 91, 191111-3.
24. Ihara, M.; Tanaka, K.; Sakaki, K.; Honma, I.; Yamada, K., Enhancement of the Absorption Coefficient of Cis-(NCS)$_2$ Bis(2,2'-bipyridyl-4,4'-dicarboxylate)ruthenium (II) Dye in Dye-Sensitized Solar Cells by a Silver Island Film. *J. Phys. Chem. B* 1997, 101, 5153-5157.
25. Ishikawa, K.; Wen, C. J.; Yamada, K.; Okubo, T., The Photocurrent of Dye-Sensitized Solar Cells Enhanced by the Surface Plasmon Resonance. *J. Chem. Eng. Jpn.* 2004, 37, 645-649.
26. Hagglund, C.; Zach, M.; Kasemo, B., Enhanced Charge Carrier Generation in Dye Sensitized Solar Cells by Nanoparticle Plasmons. *Appl. Phys. Lett.* 2008, 92, 013113-3.
27. Standridge, S. D.; Schatz, G. C.; Hupp, J. T., Toward Plasmonic Solar Cells: Protection of Silver Nanoparticles via Atomic Layer Deposition of TiO$_2$. *Langmuir* 2009, 25, 2596-2600.
28. Standridge, S. D.; Schatz, G. C.; Hupp, J. T., Distance Dependence of Plasmon-Enhanced Photocurrent in Dye-Sensitized Solar Cells. *J. Am. Chem. Soc.* 2009, 131, 8407-8409.
29. Zhao, G.; Kozuka, H.; Yoko, T., Effects of the Incorporation of Silver and Gold Nanoparticles on the Photoanodic Properties of Rose Bengal Sensitized TiO$_2$ Film Electrodes Prepared by Sol-Gel Method. *Sol. Energy Mater. Sol. Cells* 1997, 46, 219-231.
30. Wen, C.; Ishikawa, K.; Kishima, M.; Yamada, K., Effects of Silver Particles on the Photovoltaic Properties of Dye-Sensitized TiO$_2$ Thin Films. *Sol. Energy Mater. Sol. Cells* 2000, 61, 339-351.
31. Ding, I. K.; Zhu, J.; Cai, W.; Moon, S.-J.; Cai, N.; Wang, P.; Zakeeruddin, S. M.; Grätzel, M.; Brongersma, M. L.; Cui, Y.; McGehee, M. D., Plasmonic Back Reflectors: Plasmonic Dye-Sensitized Solar Cells. *Adv. Energy Mater.* 2011, 1, 51-51.
32. Brown, M. D.; Suteewong, T.; Kumar, R. S. S.; D'Innocenzo, V.; Petrozza, A.; Lee, M. M.; Wiesner, U.; Snaith, H. J., Plasmonic Dye-Sensitized Solar Cells Using Core-Shell Metal-Insulator Nanoparticles. *Nano Lett.* 2010, 11, 438-445.
33. Willets, K. A.; Van Duyne, R. P., Localized Surface Plasmon Resonance Spectroscopy and Sensing. *Annu. Rev. Phys. Chem.* 2007, 58, 267-297.
34. Kelly, K. L.; Coronado, E.; Zhao, L. L.; Schatz, G. C., The Optical Properties of Metal Nanoparticles: The Influence of Size, Shape, and Dielectric Environment. *J. Phys. Chem. B* 2002, 107, 668-677.
35. Yella, A. et al. Porphyrin-Sensitized Solar Cells with Cobalt (II/III)-Based Redox Electrolyte Exceed 12 Percent Efficiency. *Science* 334, 629-634 (2011).
36. Hardin, B. E., Snaith, H. J. & McGehee, M. D. The renaissance of dye-sensitized solar cells. *Nat Photon* 6, 162-169 (2012).
37. Ito, S. et al. Bifacial dye-sensitized solar cells based on an ionic liquid electrolyte. *Nat Photon* 2, 693-698 (2008).
38. Nazeeruddin, M. K. et al. Engineering of Efficient Panchromatic Sensitizers for Nanocrystalline TiO$_2$-Based Solar Cells. *Journal of the American Chemical Society* 123, 1613-1624 (2001).
39. Cid, J.-J. et al. Molecular Cosensitization for Efficient Panchromatic Dye-Sensitized Solar Cells. *Angewandte Chemie International Edition* 46, 8358-8362 (2007).
40. Hardin, B. E. et al. Increased light harvesting in dye-sensitized solar cells with energy relay dyes. *Nat Photon* 3, 406-411 (2009).
41. Qi, J., Dang, X., Hammond, P. T. & Belcher, A. M. Highly Efficient Plasmon-Enhanced Dye-Sensitized Solar Cells through Metal@Oxide Core-Shell Nanostructure. *ACS Nano* 5, 7108-7116 (2011).
42. Chen, H. et al. Computational Modeling of Plasmon-Enhanced Light Absorption in a Multicomponent Dye Sensitized Solar Cell. *The Journal of Physical Chemistry C* 116, 10215-10221 (2012).
43. Mahmoud, M. A., Snyder, B. & El-Sayed, M. A. Surface Plasmon Fields and Coupling in the Hollow Gold Nanoparticles and Surface-Enhanced Raman Spectroscopy. Theory and Experiment†. *The Journal of Physical Chemistry C* 114, 7436-7443 (2010).

44. Hu, M. et al. Gold nanostructures: engineering their plasmonic properties for biomedical applications. *Chemical Society Reviews* 35, 1084-1094 (2006).
45. Skrabalak, S. E. et al. Gold Nanocages: Synthesis, Properties, and Applications. *Accounts of Chemical Research* 41, 1587-1595 (2008).
46. Dang, X. et al. Virus-templated self-assembled single-walled carbon nanotubes for highly efficient electron collection in photovoltaic devices. *Nat Nano* 6, 377-384 (2011).
47. Halme, J., Vahermaa, P., Miettunen, K. & Lund, P. Device Physics of Dye Solar Cells. *Advanced Materials* 22, E210-E234 (2010).
48. Choi, H., Chen, W. T. & Kamat, P. V. Know Thy Nano Neighbor. Plasmonic versus Electron Charging Effects of Metal Nanoparticles in Dye-Sensitized Solar Cells. *ACS Nano* 6, 4418-4427 (2012)
49. Takai, A. & Kamat, P. V. Capture, Store, and Discharge. Shuttling Photogenerated Electrons across $TiO_2$-Silver Interface. *ACS Nano* 5, 7369-7376 (2011).
50. Kodali, A. K., Llora, X. & Bhargava, R. Optimally designed nanolayered metal-dielectric particles as probes for massively multiplexed and ultrasensitive molecular assays. *Proc. Natl. Acad. Sci. USA* 107, 13620-13625 (2010).
51. Milton, G. W., Nicorovici, N.-A. P., McPhedran, R. C. & Podolskiy, V. A. A proof of superlensing in the quasistatic regime, and limitations of superlenses in this regime due to anomalous localized resonance. *Proc. R. Soc. A* 461, 3999-4034 (2005).
52. Prodan, E., Radloff, C., Halas, N. J. & Nordlander, P. A hybridization model for the plasmon response of complex nanostructures. *Science* 302, 419-422 (2003).
53. Spuch-Calvar, M., Pérez-Juste, J. & Liz-Marzán, L. M. Hematite spindles with optical functionalities: growth of gold nanoshells and assembly of gold nanorods. *J. Colloid Interface Sci.* 310, 297-301 (2007).
54. Jones, M. R. et al. Templated techniques for the synthesis and assembly of plasmonic nanostructures. *Chem. Rev.* 111, 3736-3827 (2011).
55. Cortie, M. B. & McDonagh, A. M. Synthesis and optical properties of hybrid and alloy plasmonic nanoparticles. *Chem. Rev.* 111, 3713-3735 (2011).
56. Daniel, M.-C. & Astruc, D. Gold nanoparticles: assembly, supramolecular chemistry, quantum-size-related properties, and applications toward biology, catalysis, and nanotechnology. *Chem. Rev.* 104, 293-346 (2003).
57. Rycenga, M. et al. Controlling the synthesis and assembly of silver nanostructures for plasmonic applications. *Chem. Rev.* 111, 3669-3712 (2011).

Other embodiments are within the scope of the following claims.

What is claimed is:

1. A dye-sensitized solar cell comprising a photoanode including a photoabsorber and a plurality of $TiO_2$ nanoparticles and a plurality of a plasmon-forming nanostructures, wherein each plasmon-forming nanostructure includes an oxide core, an inner metallic shell on a surface of the oxide core, and an outer oxide shell on a surface of the inner metallic shell,
wherein a localized surface plasmon resonance of the plurality of plasmon-forming nanostructures matches an absorption wavelength region of the photoabsorber to balance and optimize light harvesting in different wavelengths;
wherein the oxide core including $TiO_2$ has a diameter of no greater than 50 nm, the inner metallic shell has a thickness of no greater than 5 nm, and the outer oxide shell including $TiO_2$ has a thickness of less than about 2 nm.

2. The dye-sensitized solar cell of claim 1, wherein the inner metallic shell includes Au, Ag, or a combination thereof.

3. The dye-sensitized solar cell of claim 1, wherein the plurality of plasmon-forming nanostructures is interspersed with the plurality of $TiO_2$ nanoparticles.

4. The dye-sensitized solar cell of claim 3, wherein the plasmon-forming nanostructures are 0.01 wt % to 2.5 wt % of the total nanoparticles in the photoanode.

5. A method of generating solar power, comprising illuminating a dye-sensitized solar cell including a photoabsorber and a plurality of $TiO_2$ nanoparticles and a plurality of a plasmon-forming nanostructures, wherein each plasmon-forming nanostructure includes an oxide core, an inner metallic shell on a surface of the oxide core, and an outer oxide shell on a surface of the inner metallic shell,
wherein a localized surface plasmon resonance of the plurality of plasmon-forming nanostructures matches an absorption wavelength region of the photoabsorber to balance and optimize light harvesting in different wavelengths;
wherein the oxide core including $TiO_2$ has a diameter of no greater than 50 nm, the inner metallic shell has a thickness of no greater than 5 nm, and the outer oxide shell including $TiO_2$ has a thickness of less than about 2 nm.

6. The method of claim 5, wherein the inner metallic shell includes Au, Ag, or a combination thereof.

7. The method of claim 5, wherein the plurality of a plasmon-forming nanostructures is interspersed with the plurality of $TiO_2$ nanoparticles.

8. The method of claim 7, wherein the plasmon-forming nanostructures are 0.01 wt % to 2.5 wt % of the total nanoparticles in a photoanode.

9. A method of making a dye-sensitized solar cell comprising forming a photoanode including a photoabsorber and a plurality of $TiO_2$ nanoparticles and a plurality of a plasmon-forming nanostructures, wherein each plasmon-forming nanostructure includes an oxide core, an inner metallic shell on a surface of the oxide core, and an outer oxide shell on a surface of the inner metallic shell,
wherein a localized surface plasmon resonance of the plurality of plasmon-forming nanostructures matches an absorption wavelength region of the photoabsorber to balance and optimize light harvesting in different wavelengths;
wherein the oxide core including $TiO_2$ has a diameter of no greater than 50 nm, the inner metallic shell has a thickness of no greater than 5 nm, and the outer oxide shell including $TiO_2$ has a thickness of less than about 2 nm.

10. The method of claim 9, wherein forming the photoanode includes depositing the plurality of plasmon-forming nanostructures on a substrate.

11. The method of claim 10, wherein forming the photoanode includes mixing the plurality of $TiO_2$ nanoparticles with the plurality of plasmon-forming nanostructures prior to depositing.

12. The method of claim 11, wherein the inner metallic shell includes Au, Ag, or a combination thereof.

13. The method of claim 9, wherein the plurality of plasmon-forming nanostructures is interspersed with the plurality of $TiO_2$ nanoparticles.

14. The method of claim 13, wherein the plasmon-forming nanostructures are 0.01 wt % to 2.5 wt % of the total nanoparticles in the photoanode.

* * * * *